US007571481B2

(12) United States Patent
Shimizu

(10) Patent No.: US 7,571,481 B2
(45) Date of Patent: Aug. 4, 2009

(54) COMPUTER PERIPHERAL APPARATUS AND METHOD OF CONTROLLING THE SAME

(75) Inventor: Yukihiko Shimizu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 559 days.

(21) Appl. No.: 10/704,676

(22) Filed: Nov. 12, 2003

(65) Prior Publication Data

US 2004/0230318 A1 Nov. 18, 2004

(30) Foreign Application Priority Data

Nov. 11, 2002 (JP) .............................. 2002-327144
Oct. 10, 2003 (JP) .............................. 2003-352545

(51) Int. Cl.
*G06F 11/00* (2006.01)
*G06F 15/00* (2006.01)
(52) U.S. Cl. ....................................... 726/24; 358/1.13
(58) Field of Classification Search ............. 726/22–25; 358/1.13
See application file for complete search history.

(56) References Cited

U.S. PATENT DOCUMENTS

| 5,146,459 A | 9/1992 | Shimizu | .................... 371/21.5 |
| 6,785,732 B1 * | 8/2004 | Bates et al. | .................. 709/232 |
| 6,842,861 B1 * | 1/2005 | Cox et al. | .................... 713/188 |
| 7,093,002 B2 * | 8/2006 | Wolff et al. | .................. 709/219 |
| 2002/0166068 A1 * | 11/2002 | Kilgore | ...................... 713/201 |
| 2002/0174358 A1 * | 11/2002 | Wolff et al. | .................. 713/200 |
| 2003/0018775 A1 | 1/2003 | Shiba et al. | .................. 709/223 |
| 2003/0048468 A1 * | 3/2003 | Boldon et al. | .............. 358/1.14 |

FOREIGN PATENT DOCUMENTS

| JP | 6-350784 | 12/1994 |
| JP | 07-281980 | 10/1995 |
| JP | 09-190347 | 7/1997 |
| JP | 11-119927 | 4/1999 |
| JP | 2001-034554 | 2/2001 |
| JP | 2001-051915 | 2/2001 |
| JP | 2001-273149 | 10/2001 |
| JP | 2002-182942 | 6/2002 |

* cited by examiner

*Primary Examiner*—Kimyen Vu
*Assistant Examiner*—Suman Debnath
(74) *Attorney, Agent, or Firm*—Fitzpatrick, Cella, Harper & Scinto

(57) ABSTRACT

A computer peripheral apparatus of this invention has a check step of checking whether received data is infected with a computer virus. If the received data satisfies a predetermined condition, the apparatus executes the check step before predetermined data processing. If the received data does not satisfy the predetermined condition, the apparatus executes the check step before the predetermined data processing.

5 Claims, 16 Drawing Sheets

FIG. 4

| LOG NO | USER NAME | DATE | VIRUS | FAST PRINT FLAG | .... |
|---|---|---|---|---|---|
| 0001 | USER-A | 20010914 | OBL | 1 | .... |
| 0002 | USER-B | 20010918 | OBL | 1 | .... |
| 0003 | USER-A | 20011207 | KXP | 0 | .... |
| ⋮ | | | | | .... |

FIG. 6

| | |
|---|---|
| TRANSMISSION SOURCE USER NAME | ~601 |
| TRANSMISSION SOURCE COMPUTER NAME | ~602 |
| NETWORK PHYSICAL ADDRESS | ~603 |
| NETWORK IP ADDRESS | ~604 |
| TRANSMISSION SOURCE DOMAIN NAME | ~605 |
| PASSWORD | ~606 |
| OPERATION MODE | ~607 |
| FINAL VIRUS CHECK LOG | ~608 |
| PATTERN FILE ATTRIBUTE VALUE | ~609 |
| PRINTER DRIVER ATTRIBUTE VALUE | ~610 |
| PRINT DATA | ~611 |

FIG. 7

| | |
|---|---|
| TRANSMISSION SOURCE USER NAME | C001 ~ C099 |
| TRANSMISSION SOURCE COMPUTER NAME | GANON**** (*: 0 ~ 9) |
| NETWORK PHYSICAL ADDRESS | 00D086*0*** (*: 0 ~ F) |
| NETWORK IP ADDRESS | 127.0.*.* (*: 0 ~ 255) |
| TRANSMISSION SOURCE DOMAIN NAME | NO_VIRUS*** (*: 0 ~ 9) |
| PASSWORD | DON'T CARE |
| OPERATION MODE | DON'T CARE |
| FINAL VIRUS CHECK LOG | DATE > 2002.03.20 |
| PATTERN FILE ATTRIBUTE VALUE | DATE_VERSION > 2002.03.01 |
| PRINTER DRIVER ATTRIBUTE VALUE | VERSION > GANON_DRV_V7.12 |

FIG. 8

| JOB TYPE | PRINT | PDF-DIRECT-PRINT | SEND | BOX |
|---|---|---|---|---|
| TRANSMISSION SOURCE USER NAME | C001~C099 | No User Applied | C001~C012 | C001~C034 |
| TRANSMISSION SOURCE COMPUTER NAME | GANON*****(*:0~9) | No Computer Applied | GANON001**(*:0~9) | GANON00**(*:0~9) |
| NETWORK PHYSICAL ADDRESS | 00D086*0***(*:0~F) | No MAC Address Addlied | 00D086B0**A(*:0~F) | 00D086B0***(*:0~F) |
| NETWORK IP ADDRESS | 127.0.*.*(*:0~255) | No IP Address Applied | 127.0.255.*(*:0~128) | 127.0255.*(*:0~255) |
| TRANSMISSION SOURCE DOMAIN NAME | NO_VIRUS***(*:0~9) | No Domain Applied | NO_VIRUS11*(*:0~9) | NO_VIRUS1**(*:0~9) |
| PASSWORD | DON'T CARE | DON'T CARE | DON'T CARE | DON'T CARE |
| OPERATION MODE | DON'T CARE | DON'T CARE | DON'T CARE | DON'T CARE |
| FINAL VIRUS CHECK LOG | DATE > 20020320 | No History Applied | DATE > 20020920 | DATE > 20020620 |
| PATTERN FILE ATTRIBUTE VALUE | DATE_Ver. > 20020301 | No Pattern Applied | DATE_Ver. > 20020901 | DATE_Ver. > 20020601 |
| PRINTER DRIVER ATTRIBUTE VALUE | Ver. > CDRV_V712 | No Driver Applied | Ver. > CDRV_V802 | Ver. > CDRV_V720 |

COMPUTER PERIPHERAL APPARATUS AND METHOD OF CONTROLLING THE SAME

FIELD OF THE INVENTION

The present invention relates to an anti-computer virus technique in a computer peripheral apparatus for performing specific processing for data supplied from an external apparatus.

BACKGROUND OF THE INVENTION

A computer virus is a typical example of an unauthorized job or data. For example, as an apparatus for suppressing computer virus infection, Japanese Patent Laid-Open No. 6-350784 discloses a facsimile apparatus which, when detecting that a received file is contaminated with a computer virus, erases the contaminated file, and transmits a warning to the file transmitter. Also, Japanese Patent Laid-Open No. 11-119927 discloses a printer apparatus which receives printing data and a program language, and detects and removes a computer virus mixed in the program language.

Recently, some computer peripheral apparatuses such as printers have a virus check function and can be operated in either a virus check preference mode in which data processing is performed after virus check is performed for a received job, and a data processing preference mode (high-speed processing mode) in which virus check is performed after data processing for a received job is completed.

If, however, an apparatus having the high-speed processing mode as described above intermittently receives in this high-speed processing mode a job contaminated by a computer virus which poses a problem in the apparatus itself, damage to the apparatus may become enormous.

For example, a control program of a printer or multifunction apparatus often has a strong authorization capable of directly controlling hardware such as a printer controller and video controller. Therefore, damage can be given to the apparatus by hiding harmful data in a job and causing the control program to process the job. Practical examples of such an attack from a malicious third party will be described below.

A first example is internal data destruction by a print job transmitted from a client PC (personal computer) to a printer. As shown in FIG. 11, a printer normally reads out data such as a font stored in a specific area of an internal hard disk of the printer, in accordance with a command contained in printing data (PDL JOB) transferred from a client PC, and rasterizes the data inside a controller. The first attack example abuses this mechanism. That is, as shown in FIG. 12, the first attack example hides harmful data which looks like font data in a print job, and causes the printer to write this data in a specific area of the internal hard disk of the printer, thereby destroying data such as fonts and programs stored in the specific area.

A second example is an indiscriminate transmission attack by a job transmitted from a client PC to a multifunction apparatus. This attack will be explained by taking facsimile transmission from a multifunction apparatus A to a multifunction apparatus B as an example. As shown in FIG. 13, this is usually done by the multifunction apparatus A by reading an address designation command contained in a facsimile transmission job (SEND job) received from a client PC. The second attack example misuses this mechanism. That is, as shown in FIG. 14, the second attack embeds a harmful code in the address designation command of the facsimile transmission job, and forces the multifunction apparatus A to transmit the same job to all data in an address notebook stored in the multifunction apparatus A. If a transmission destination is a multifunction apparatus of the same type, the same processing may be recurrently repeated to allow the harmful code to propagate in a broad range in a moment.

A third example is internal data destruction by a storage job transmitted from a client PC to a multifunction apparatus. As shown in FIG. 15, a multifunction apparatus can normally store data in a specific area (box) of an internal hard disk of the apparatus, in accordance with a storage destination control command, which is contained in a storage job (BOX JOB) transferred from a client PC. The third attack example misuses this mechanism. That is, as shown in FIG. 16, the third attack example hides a harmful code in the storage destination control command contained in the storage job, thereby overwriting all stored data in the box while erasing the data.

SUMMARY OF THE INVENTION

It is an object of the present invention to provide a computer peripheral apparatus capable of minimizing damage caused by computer viruses as described above, and a method of controlling the same.

According to one aspect of the present invention, preferably, a computer peripheral apparatus for receiving data to be processed from an external apparatus, and performing predetermined data processing, comprises:

a check unit adapted to check whether received data is infected with a computer virus; and a control unit adapted to activate the check unit after the predetermined data processing if the received data satisfies a predetermined condition, and activate the check unit before the predetermined data processing if the received data does not satisfy the predetermined condition.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing the structure of a virus infection log of the first embodiment;

FIG. 6 is a view showing the structure of a print job supplied to the printer of the second embodiment;

FIG. 7 is a view showing the structure of a safety check table of the second embodiment;

FIG. 8 is a view showing the structure of a safety check table applied to a multifunction apparatus;

DETAILED DESCRIPTION OF THE PREFERRED EMBODIMENTS

Preferred embodiments of the present invention are described in detail in accordance with the accompanying drawings.

First Embodiment

Figure 1:
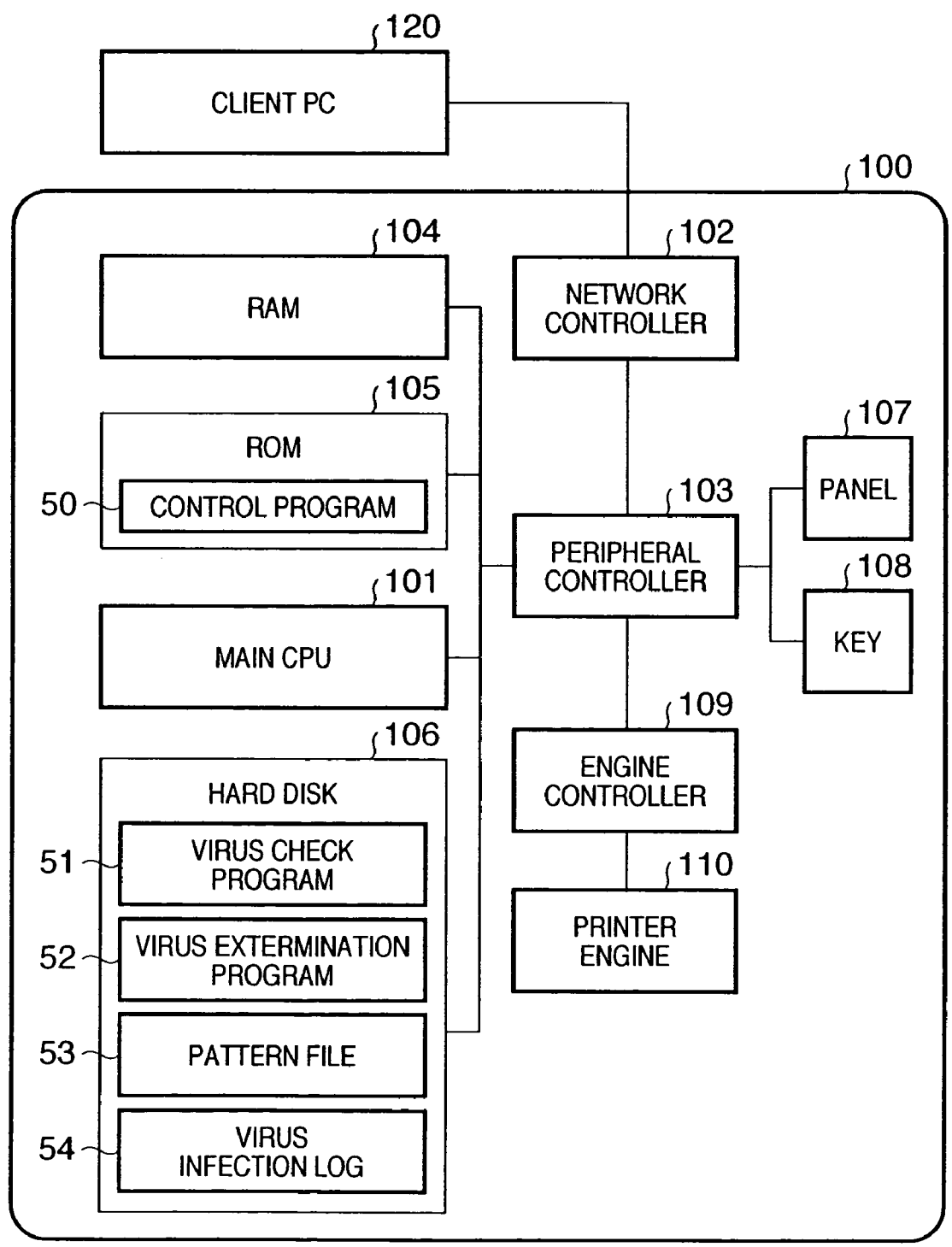
FIG. 1 is a block diagram showing the arrangement of a printer as a computer peripheral apparatus of an embodiment.

FIG. 1 is a block diagram showing the arrangement of a printer as a computer peripheral apparatus of this embodiment.

A printer 100 is connected to a client PC 120 as an external apparatus so as to be able to communicate with the client PC 120. Note that although only one client PC connected to the printer 100 is illustrated in FIG. 1, a plurality of client PCs can exist in practice. Since these client PCs are sources of supplying data to the printer 100, they will be also called "supply source computers" hereinafter. Note also that the form of connection between the client PC and printer can be either wired or wireless.

Basically, the printer 100 prints on the basis of data supplied from the client PC 120. In the printer 100, a main CPU 101 is a central control unit for controlling the whole apparatus. A network controller 102 controls transmission and reception. That is, the network controller 102 receives a print request, print data, storage request, storage data, and the like from the client PC 120, and transmits status information of the printer 100, e.g., error information indicating paper jam, to the client PC 120.

A peripheral controller 103 controls peripheral devices 104 to 108 connected to the main CPU 101. A RAM 104 temporarily stores print data and the like, and also functions as a main memory. A ROM 105 is a read only memory for storing, e.g., a control program 50 for controlling the whole apparatus, e.g., controlling activation of the printer 100 itself.

A hard disk unit 106 is a magnetic recording medium, i.e., a nonvolatile storage means used to temporarily or permanently store, e.g., print data and storage data, and temporarily save data exceeding the capacity of the RAM 104. As shown in FIG. 1, the hard disk unit 106 also stores a virus check program 51 for checking the presence/absence of infection of a computer virus (to be simply referred to as a "virus" hereinafter), a virus extermination program 52 for exterminating a virus, a pattern file 53 for detecting a virus, and a virus infection log 54 (to be described later). The virus check program 51 and virus extermination program 52 are called by the control program 50 described above, loaded in the RAM 104, and executed by the main CPU 101.

A panel 107 is a monitor for displaying the state of the printer 100. A key 108 is an input device which accepts a control request to the printer 100 and display switching to the panel 107.

An engine controller 109 controls driving of a printer engine 110, output data transfer, and the like. The printer driver 110 is a printer mechanism for outputting a final output image.

The above-mentioned printer has a virus check function achieved by the virus check program 51 and can be operated in either a "virus check preference mode" in which data processing is performed after virus check is performed for a received job, or a "data processing preference mode (high-speed processing mode)" in which virus check is performed after specific data processing (e.g., printing) for a received job is completed. More specifically, in the high-speed processing mode, to avoid a decrease in operating speed caused by virus check, virus check is performed for received print data after job processing is completed or if the CPU 101 has not received any job for a predetermined time period after job processing is completed.

Figure 2:
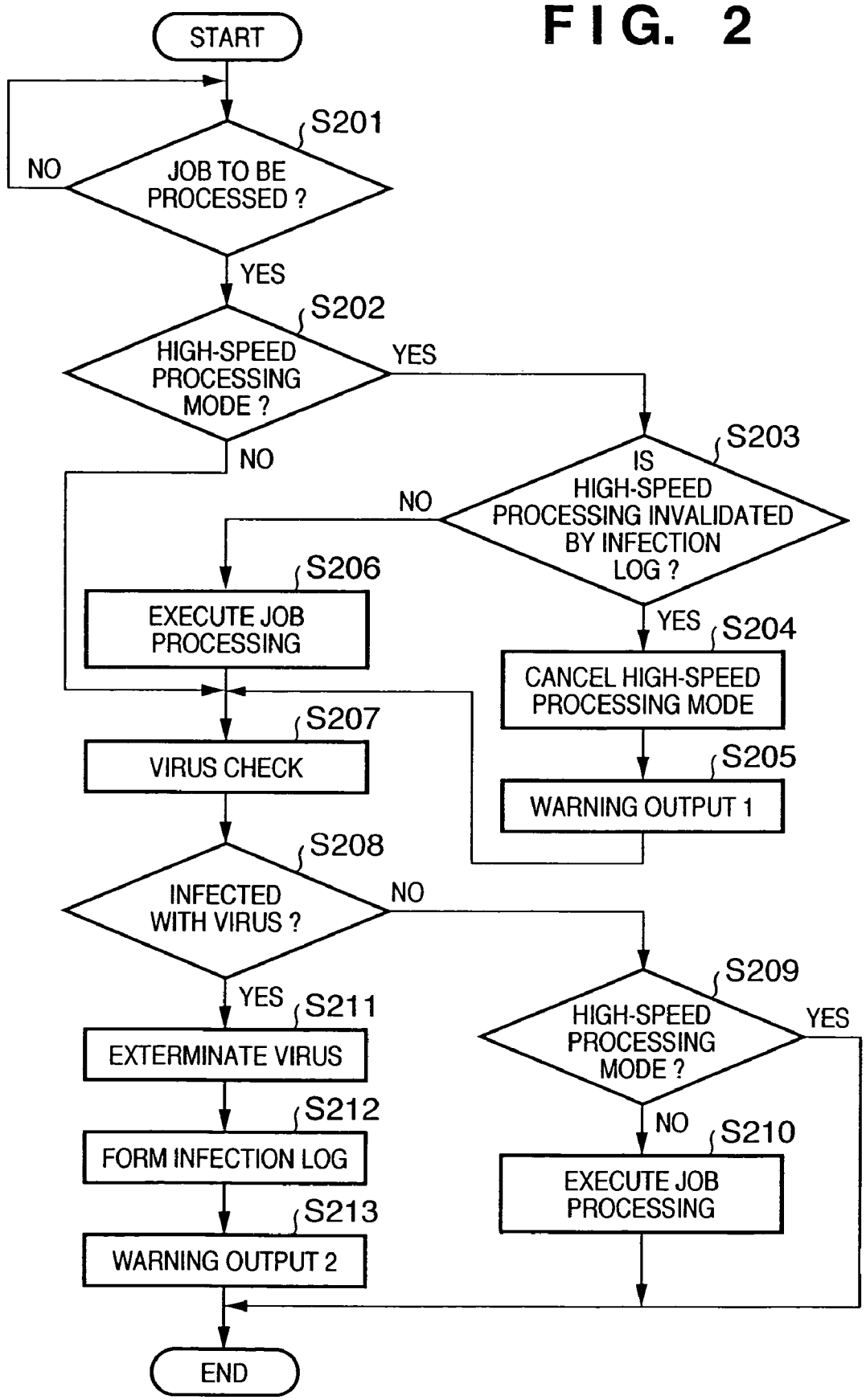
FIG. 2 is a flow chart showing the contents of processing performed by a printer of the first embodiment.

FIG. 2 is a flow chart showing the contents of processing performed by the printer 100 of this embodiment. A program corresponding to this flow chart is contained in the control program 50 stored in the ROM 105, and executed by the main CPU 101.

First, in step S201, the presence/absence of a print job is determined. More specifically, when receiving a print request from the client PC 120, the printer 100 operates as follows. First, the network controller 102 requests the main CPU 101 to generate a command for acquiring internal status information of the printer. In response to this request, the main CPU 101 verifies the normality of the state of all the internal devices. After confirming that the internal state of the printer 100 has no abnormality, the main CPU 101 transmits to the network controller 102 a code indicating that the internal state of the printer 100 is normal. If the internal state of the printer 100 is abnormal, the main CPU 101 transmits to the network controller 102 a code containing an error code indicative of the abnormal portion. The network controller 102 receives this code concerning the internal state from the main CPU 101, and transfers the received code to the client PC 120. If the client PC 120 determines on the basis of the received code that the internal state of the printer 100 is normal, the client PC 120 starts transmitting print data.

Figure 3:
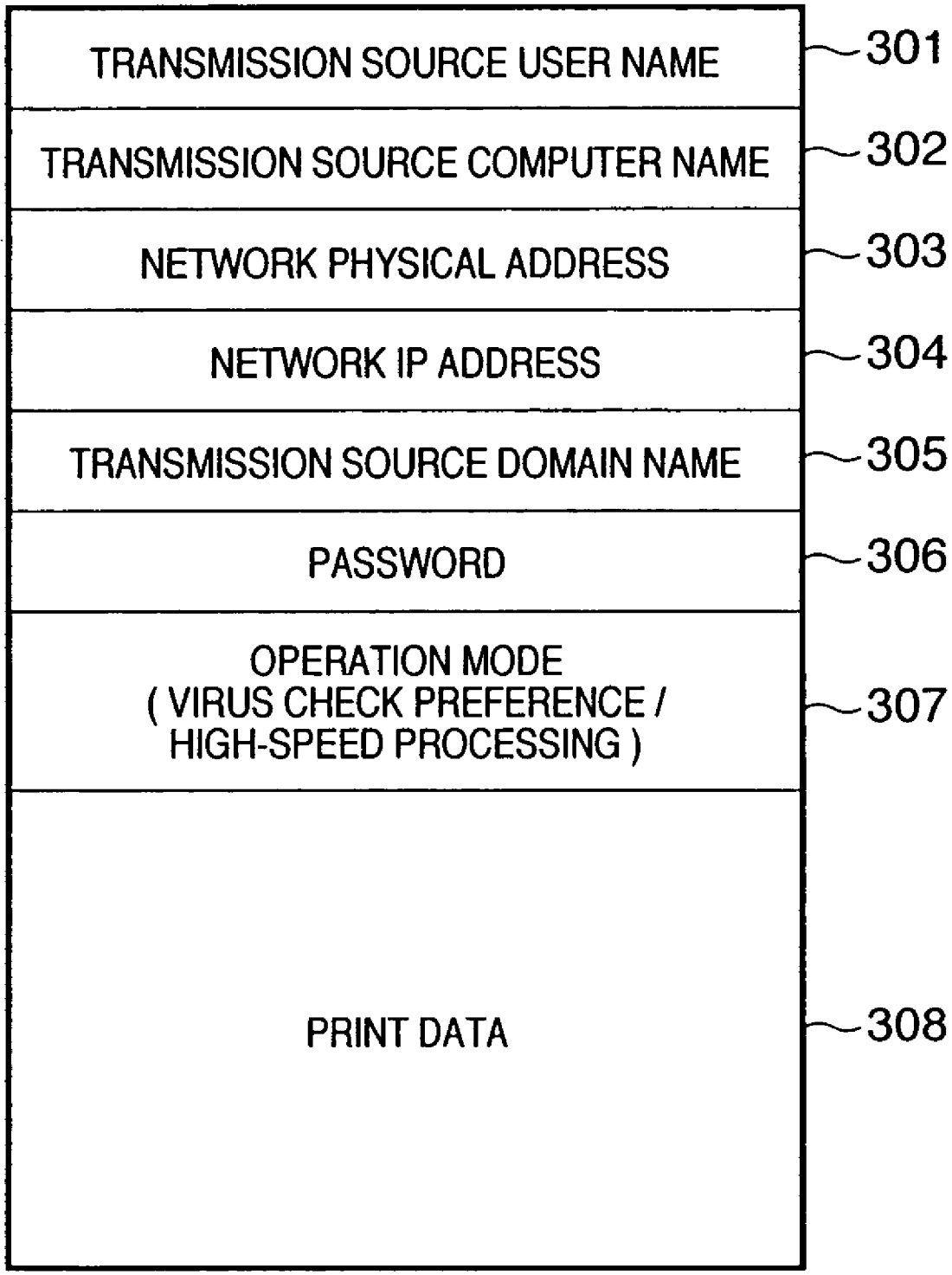
FIG. 3 is a view showing the structure of a print job supplied to the printer of the first embodiment.

FIG. 3 shows the structure of print job data supplied from the client PC 120 to the printer 100.

As shown in FIG. 3, the print job data includes, e.g., attribute information such as a transmission source user name 301, a transmission source computer name 302, a network physical address 303 of the transmission source computer, an IP address 304 of the transmission source computer, a domain name 305 to which the transmission source computer belongs, password information 306 for obtaining printout permission, and information (flag) 307 for designating an operation mode (virus check preference mode/high-speed processing mode), in addition to print data 308.

In step S202, if all print data from the client PC 120 is received, the flag 307 for designating an operation mode for the job is checked. If the high-speed processing mode is designated, the flow advances to step S203 to load into the RAM 104 the virus infection log 54 (i.e., the log of reception of virus infected data) recorded in the hard disk unit 106, and search the contents. FIG. 4 shows the structure of the virus infection log 54.

For example, the virus infection log 54 contains a log number (LOG NO) for indexing individual information of the log, a user name (USER NAME) indicating the name of a user who has sent infected data, date information (DATE) indicating the sending date of infected data, and information (VIRUS TYPE) pertaining to the type of virus. In addition, the virus infection log 54 of this embodiment contains data (FAST PRINT FLAG) indicating whether an operation is possible in the high-speed processing mode. For example, if FAST PRINT FLAG=0, an operation in the high-speed processing mode is invalid; if FAST PRINT FLAG=1, an operation in the high-speed processing mode is valid. This FAST PRINT FLAG can be set on the basis of input from the panel 107 or key 108 of the printer 100, or on the basis of input information from an external apparatus.

In step S203 of searching the contents of the virus infection log 54, if there is no log of a user name (USER NAME) matching the transmission source user name 301 of the received data, or if a log of a user name matching the transmission source user name 301 of the received data is present and FAST PRINT FLAG of the log is set to 1 (i.e., if an operation in the high-speed processing mode is valid), the flow advances to step S206 to execute job processing (e.g., printing) of the received jog. After that, the flow advances to step S207.

On the other hand, in step S203 of searching the contents of the virus infection log 54, if the virus infection log 54 has a log of a user name (USER NAME) matching the transmission source user name 301 of the received data and, preferably, if FAST PRINT FLAG of the log is set to 0 (i.e., if an operation in the high-speed processing mode is invalid), the flow advances to step S204 to cancel the high-speed processing mode (i.e., switch to the virus infection preference mode) by changing the operation mode designating flag 307 in the received data. The flow then advances to step S205. If a plurality of logs of the same user such as LOG Nos. 0001 and 0003 in FIG. 4 are present and, if FAST PRINT FLAG=0 in even one of these logs, it is preferable to cancel the high-speed processing mode and skip the job processing in step S206 from the viewpoint of safety. In step S205, warning data (stored in, e.g., the hard disk 106) for notifying that the high-speed processing mode is canceled is loaded into the RAM 104, converted into print data from the engine controller 109 to the printer engine 110, and printed out. After that, the flow advances to step S207. As described above, if in step S203 it is determined on the basis of the contents of the virus infection log 54 that the safety of the received data is not ensured, the job processing in step S206 is skipped, and the high-speed processing mode is canceled.

If the high-speed processing mode is not designated in step S202 (i.e., if the virus check preference mode is designated), the flow immediately advances to step S207.

In step S207, the virus check program 51 stored in the hard disk unit 106 is called. In response to this call, the virus check program 51 and the pattern file 53 for detecting a virus are loaded into the RAM 104, and the virus check program 51 is activated to perform virus check. In step S208, whether the print data is infected with a virus is determined on the basis of the result of the virus check. If it is determined that the print data is not infected with any virus, the virus check program 51 is terminated, and the flow advances to step S209.

In step S209, whether the printer 100 is operating in the high-speed processing mode is determined. This determination can be done by determining whether the job processing in step S206 is executed. As described above, step S206 is executed when the high-speed processing mode is designated for the received data (YES in step S202), and no problem is found by the search of the contents of the virus infection log 54 (NO in step S203). In this case, the job processing is already completed in step S206, so this process is terminated. In other cases, the flow advances to step S210 to execute corresponding job processing.

If it is determined in step S208 that the print data is infected with a virus, the flow advances to step S211 to call the virus extermination program 52 stored in the hard disk unit 106. In response to this call, the virus extermination program 52 is loaded into the RAM 104 and activated. Consequently, the virus contained in the print data is invalidated.

In step S212, in accordance with the format as shown in FIG. 4, a new log number is generated in the virus infection log 54 loaded in the RAM 104, and an infection log of this print data is additionally written. The thus updated virus infection log 54 is also copied to the hard disk unit 106. In addition, if the high-speed processing mode has not been invalidated yet at this point, the mode is invalidated.

In step S213, warning data (stored in, e.g., the hard disk 106) indicating that the received data is infected with a virus and the virus is exterminated is loaded into the RAM 104, converted into print data from the engine controller 109 to the printer engine 110, and printed out. After that, this process is terminated.

In the first embodiment described above, even when the high-speed processing mode in which execution of job processing is given priority over virus check is designated (YES in step S202), if in step S203 it is determined on the basis of the search of the contents of the virus infection log 54 that received data may be infected with a virus, the job processing in step S206 is skipped, and as a consequence the high-speed processing mode is canceled.

As described above, the printer of this embodiment has a check unit for performing virus check on supplied data, and stores a reception log of data infected with a virus in a memory. This printer further includes a controller for selecting the virus check preference mode in which virus check is executed prior to predetermined data processing such as printing, or the data processing preference mode (high-speed processing mode) in which virus check is performed after the predetermined data processing, and controlling the virus check execution timing in accordance with the selected mode. When selecting the high-speed processing mode, the controller changes this high-speed processing mode to the virus check preference mode on the basis of the reception log.

In addition to the processing explained above, it is also possible to change the program such that the high-speed processing mode is reset when a predetermined time has elapsed after the high-speed processing mode is cancelled in step S203.

Also, in the first embodiment, after the job processing is executed in the high-speed processing mode in step S206, the flow advances to step S207 to perform virus check. However, if jobs in the high-speed processing mode are continuously set, virus check may also be executed when jobs are not processed for a predetermined time or more, or at specific time (e.g., 2 a.m.).

In the first embodiment described above, a printer which receives data to be printed from an external apparatus and prints the data is explained. However, the present invention is also applicable to a computer peripheral apparatus such as a multifunction data processor (multifunction apparatus) having not only the above-mentioned printing function but also a facsimile transmitting/receiving function, a universal send function of simultaneously distributing digital data across a network to a plurality of addresses, a box function of storing data in an internal nonvolatile memory (e.g., a hard disk unit) of the apparatus, and the like.

Second Embodiment

The second embodiment controls the execution timing of virus check on the basis of attribute information of supplied data.

Figure 9:
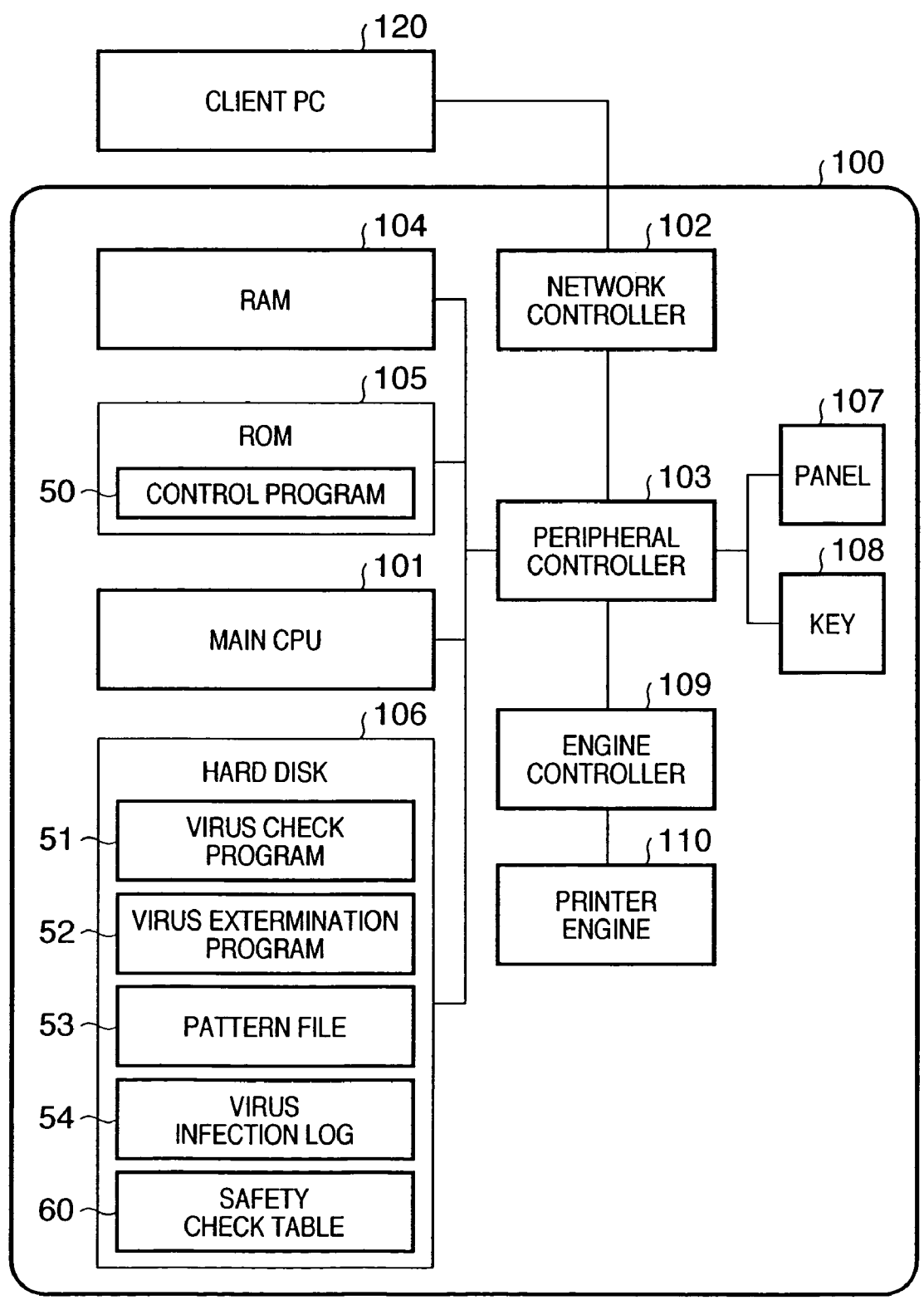
FIG. 9 is a block diagram showing the arrangement of the printer of the second embodiment.

FIG. 9 is a block diagram showing the arrangement of a printer of this embodiment. The same reference numerals as the components shown in FIG. 1 of the first embodiment denote the same components in FIG. 9. As shown in FIG. 9, the arrangement of this printer is almost the same as the printer of the first embodiment, so a description of each part will be omitted. The difference from the printer of the first embodiment is that a hard disk unit 106 further stores a safety check table 60.

Figure 10:
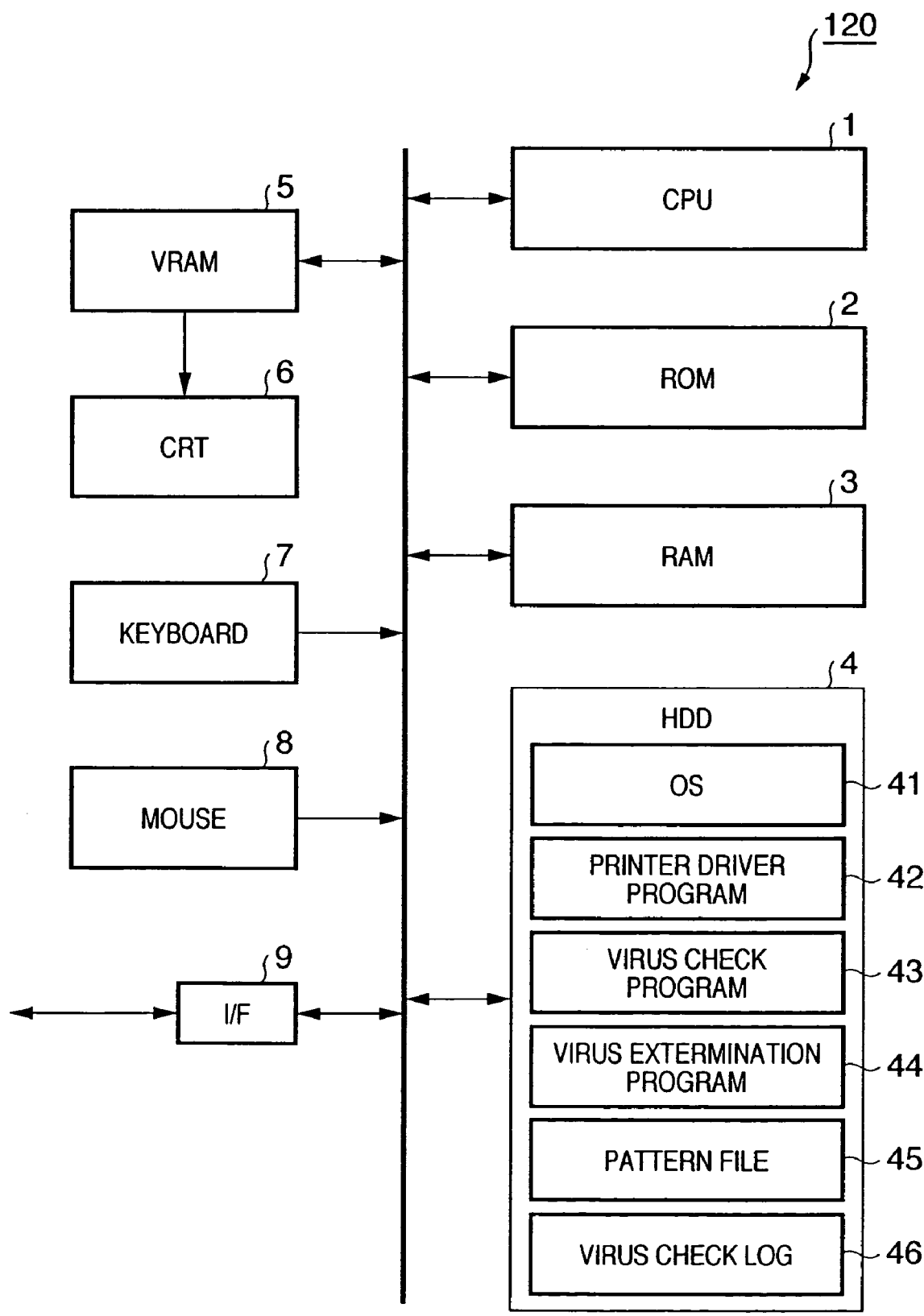
FIG. 10 is a block diagram showing the arrangement of a client PC of the second embodiment.
Figure 11:
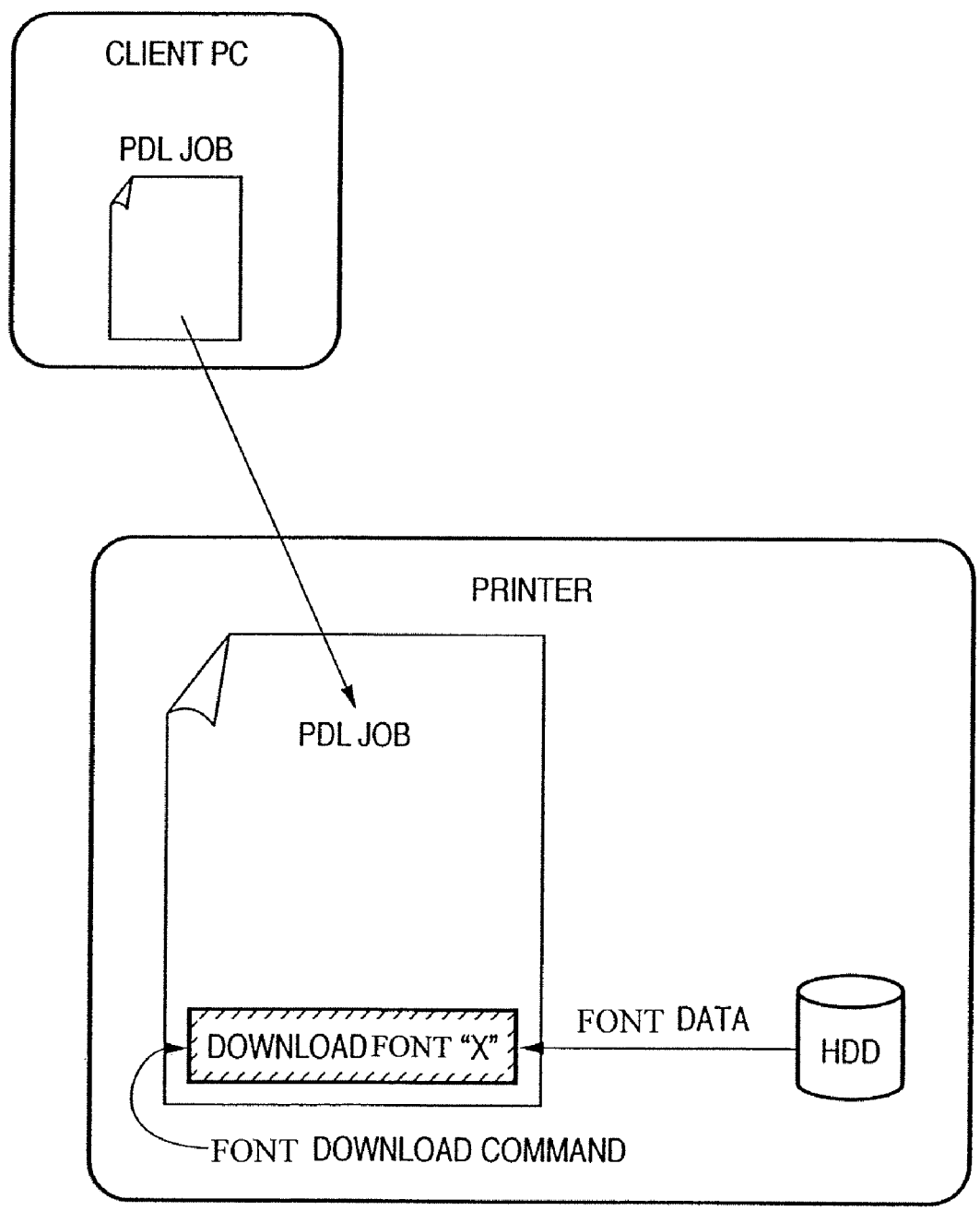
FIG. 11 is a view for explaining processing for a normal print job.
Figure 12:
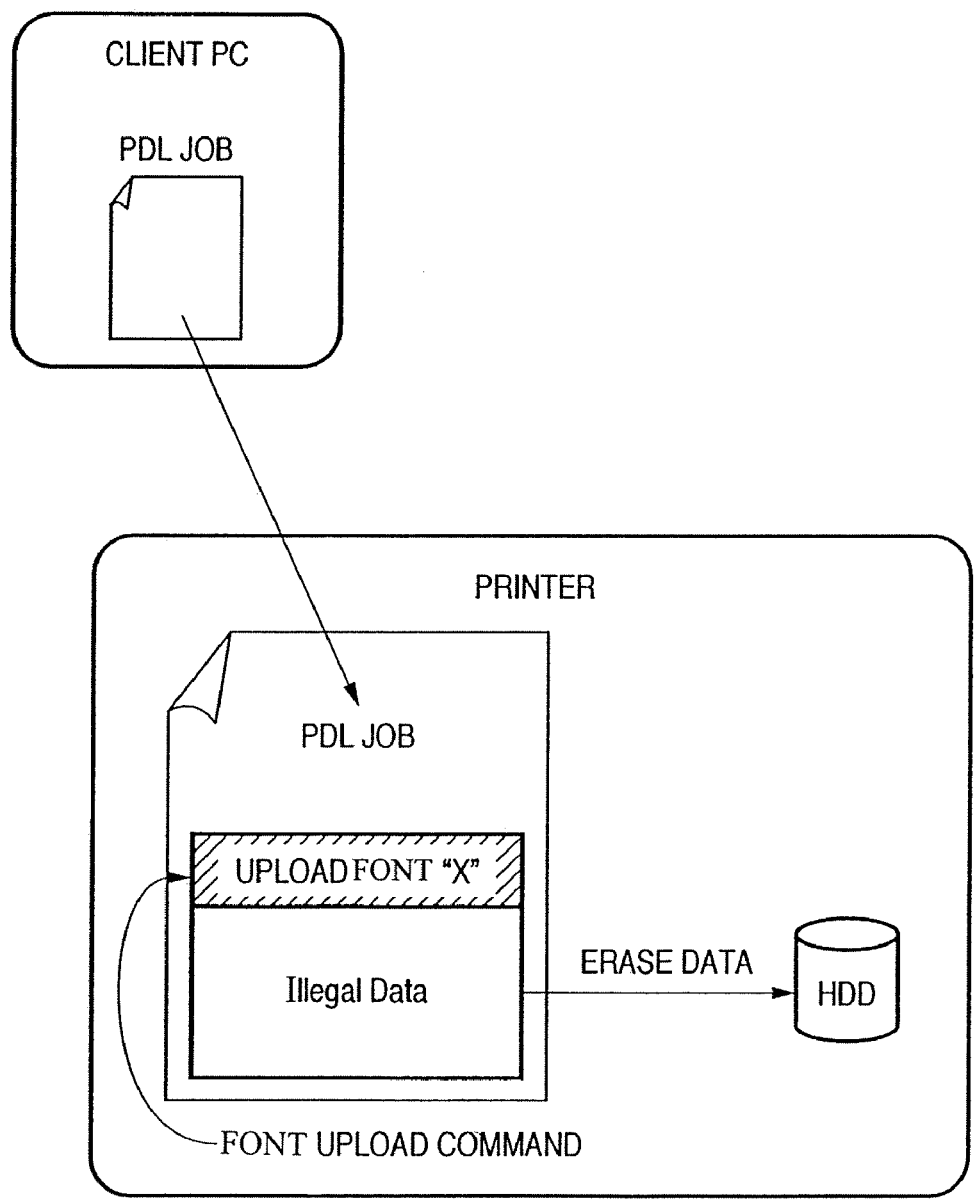
FIG. 12 is a view for explaining internal data destruction by a print job containing a harmful code.
Figure 13:
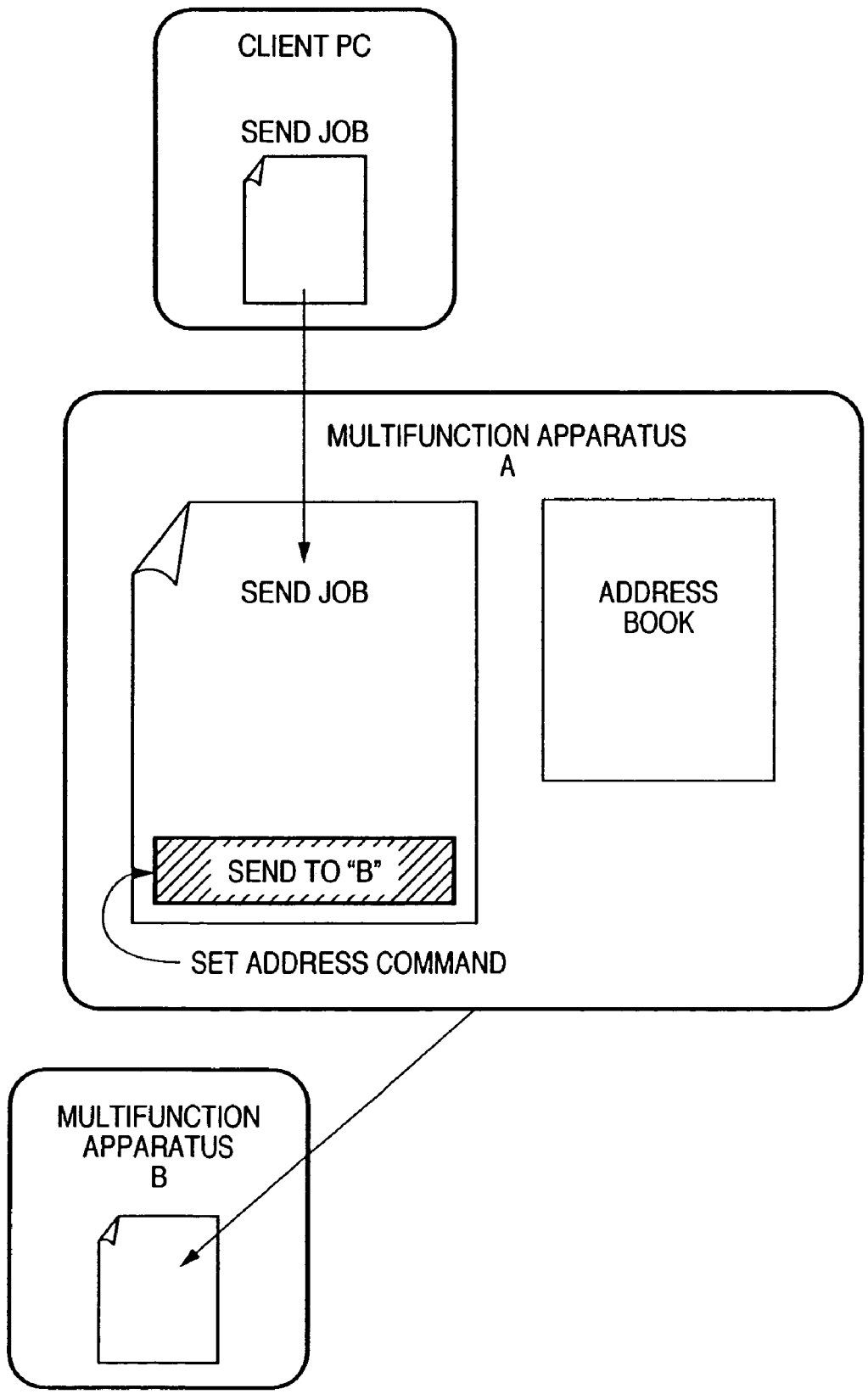
FIG. 13 is a view for explaining processing for a normal transmission job.
Figure 14:
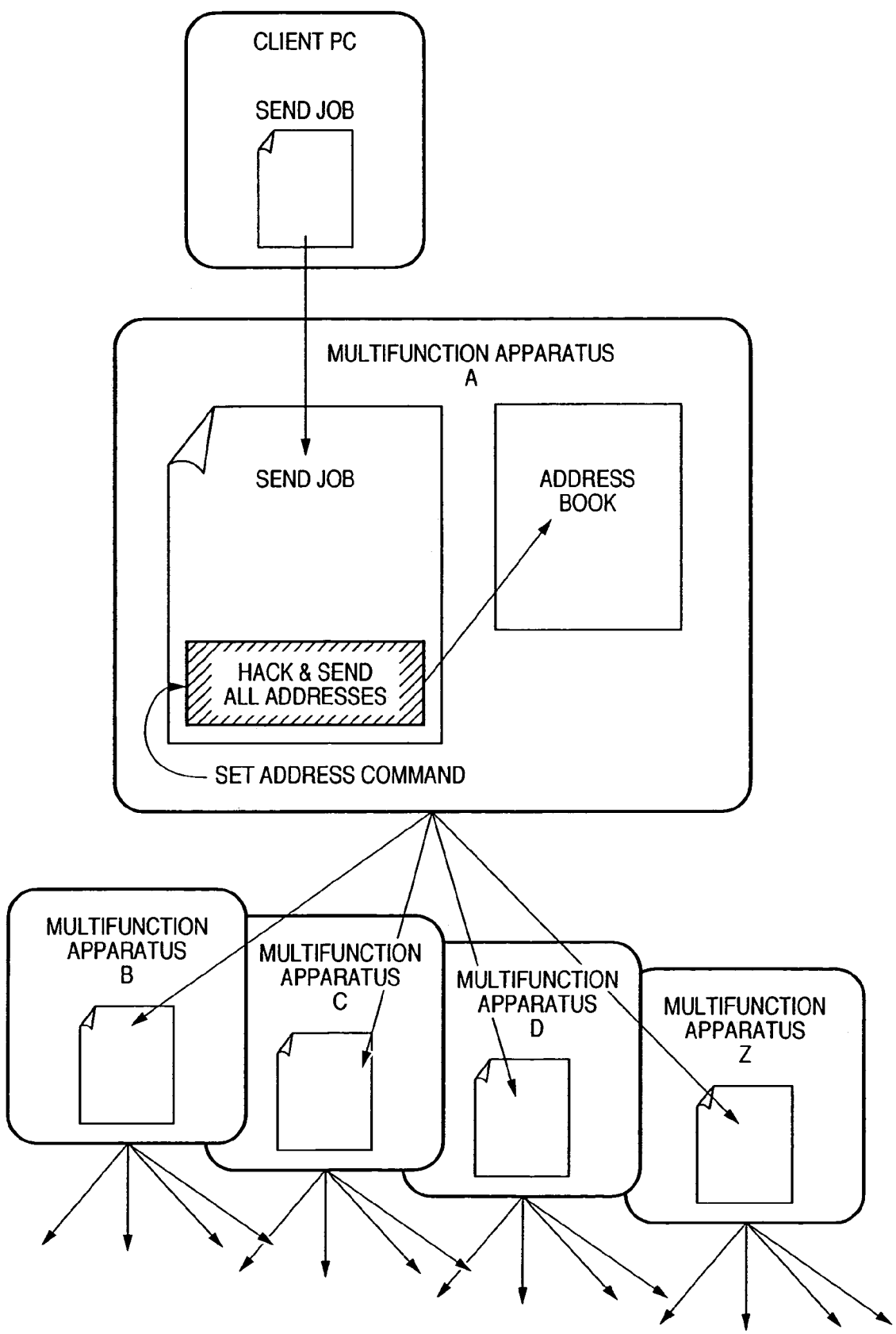
FIG. 14 is a view for explaining indiscriminate transmission by a transmission job containing a harmful code.
Figure 15:
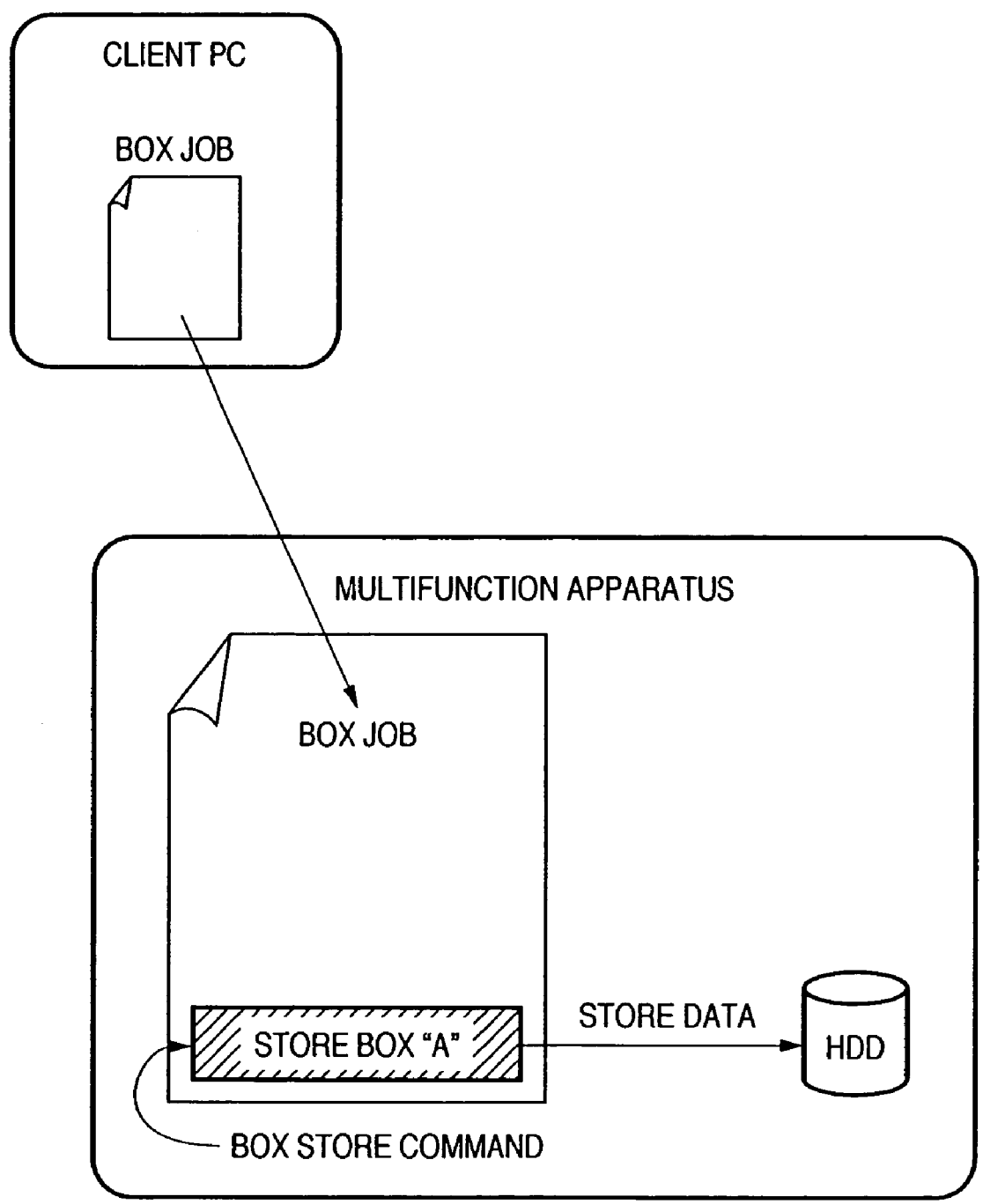
FIG. 15 is a view for explaining processing for a normal storage job.
Figure 16:
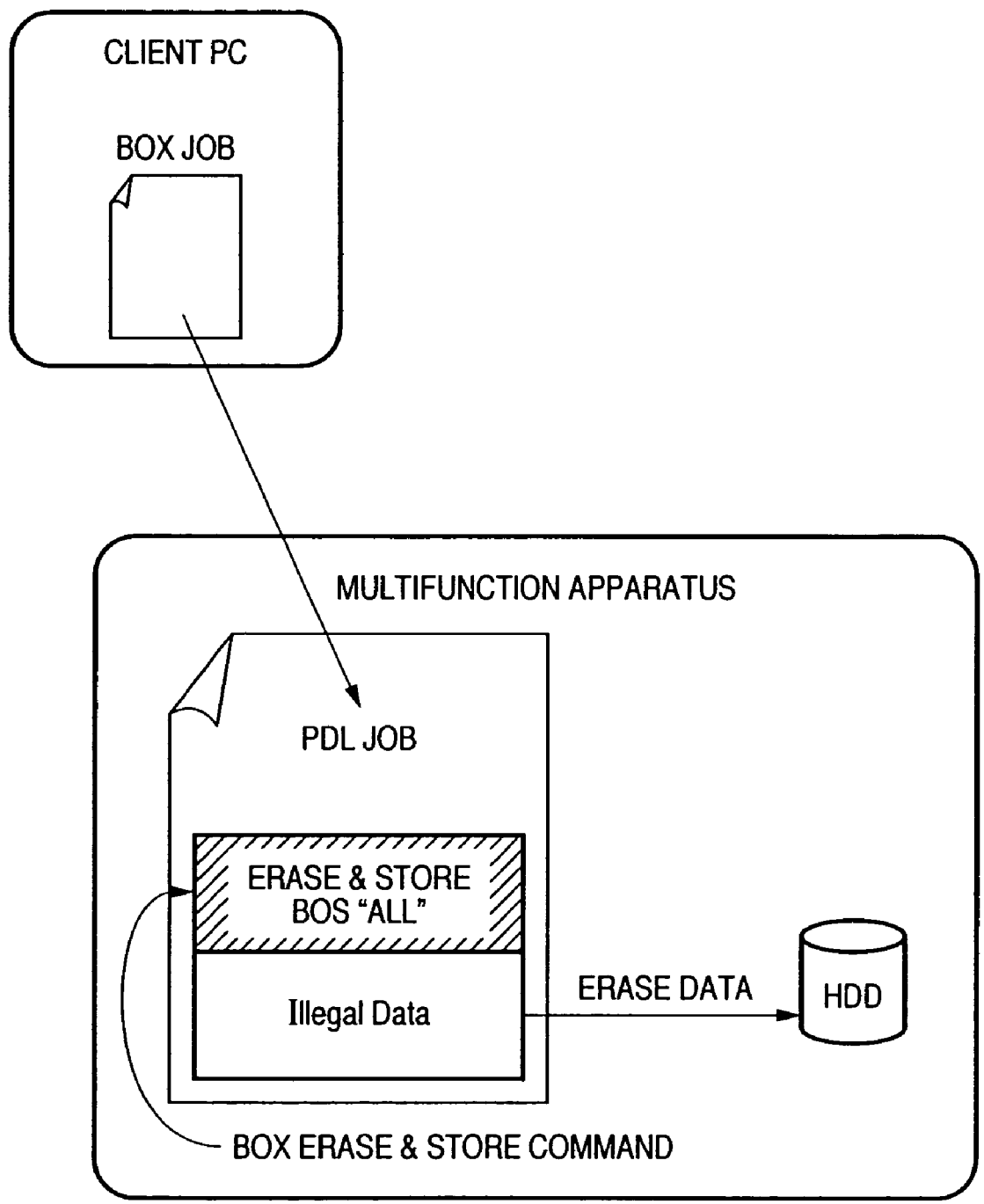
FIG. 16 is a view for explaining internal data destruction by a storage job containing a harmful code.

More specifically, a client PC 120 of this embodiment is arranged as shown in FIG. 10.

Referring to FIG. 10, a CPU 1 controls the whole computer, a ROM 2 stores a boot program and the like, a RAM 3 functions as a main memory, and a hard disk driver (HDD) 4 stores various programs and data. A memory (VRAM) 5 is used to rasterize image data to be displayed. Image data or the like can be displayed on a CRT 6 by rasterizing the data in the VRAM 5. Reference numerals 7 and 8 denote a keyboard and mouse, respectively, as input devices; and 9, an interface (I/F) for connecting to a printer 100. In this embodiment, as shown in FIG. 10, an OS 41, a printer driver program 42 (to be simply referred to as a "printer driver" hereinafter) for generating print job data for the printer 100, a virus check program 43, a virus extermination program 44, a pattern file 45, a virus check log 46, and the like are installed in the HDD 4.

Figure 5:
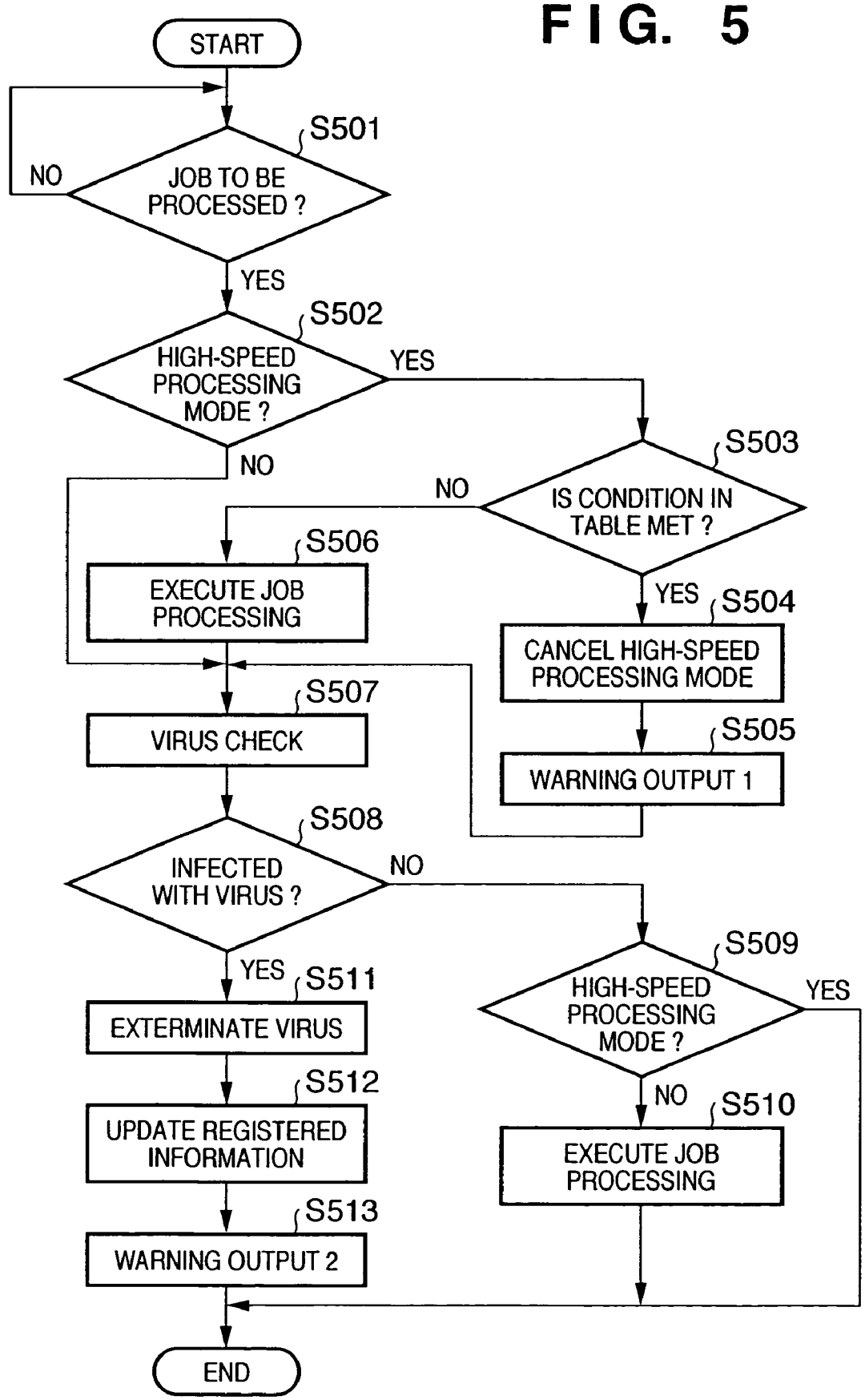
FIG. 5 is a flow chart showing the contents of processing performed by a printer of the second embodiment.

FIG. 5 is a flow chart showing data processing performed by the printer 100 of this embodiment. A program corresponding to this flow chart is contained in a control program stored in a ROM 105, and executed by a main CPU 101.

First, in step S501, the presence/absence of a print job is determined.

That is, when receiving a print request from the client PC 120, the printer 100 operates as follows. First, a network controller 102 requests the main CPU 101 to generate a command for acquiring internal status information of the printer. In response to this request, the main CPU 101 causes a peripheral controller 103 to verify the normality of the state of all the internal devices. After confirming that the internal state of the printer 100 has no abnormality, the main CPU 101 transmits to the network controller 102 a code indicating that the internal state of the printer 100 is normal. If the internal state of the printer 100 is abnormal, the main CPU 101 transmits to the network controller 102 a code containing an error code indicative of the abnormal portion. The network controller 102 receives this code concerning the internal state from the main CPU 101, and transfers the received code to the client PC 120.

If the client PC 120 determines on the basis of the received code that the internal state of the printer 100 is normal, the client PC 120 activates the printer driver 42. The printer driver 42 refers to the pattern file 45, and reads out the attribute value of the file (e.g., version information of the pattern file 45). Also, the printer driver 42 refers to the virus check log 46, and reads out a final virus check log (e.g., date information indicating the last virus check execution date). The printer driver 42 adds these pieces of readout information as attribute values to print job data to be transmitted to the printer 100. Furthermore, the printer driver 42 adds a transmission source user name, transmission source computer name, network physical address, network IP address, transmission source domain name, and printer driver 42 version information as attribute values to the print job data. After that, the printer driver 42 starts transmitting the print job data.

FIG. 6 shows the structure of the print job data generated by the printer driver 42.

As shown in FIG. 6, the print job data includes, e.g., attribution information such as a transmission source user name 601, a transmission source computer name 602, a network physical address 603 of the transmission source computer, an IP address 604 of the transmission source computer, a domain name 605 to which the transmission source computer belongs, password information 606 for obtaining printout permission, information (flag) 607 for designating an operation mode (virus check preference mode/high-speed processing mode), a final virus check log 608 of the transmission source computer, a pattern file attribute value 609 of the transmission source computer, and a printer driver attribute value 610 of the transmission source computer, in addition to print data 611.

In step S502, if all print data from the client PC 120 is received, the flag 607 for designating an operation mode for the job is checked. If the high-speed processing mode is designated, the flow advances to step S503.

In step S503, the safety check table 60 recorded in the hard disk 106 is loaded into the RAM 104 to determine whether attribute information contained in the received print job data meets conditions registered in the table 60, thereby checking the safety of the job. FIG. 7 shows the structure of the safety check table 60. As shown in FIG. 7, the safety check table 60 has items corresponding to the attribute information 601 to 610 of the job data shown in FIG. 6, and describes a condition for determining the safety for each item. Some conditions described in the table shown in FIG. 7 will be explained below. For example, the transmission source computer name is set under the condition that the computer name must begin with "GANON" followed by arbitrary numbers. The final virus check log is set under the condition that the execution date of the last virus check in the transmission source computer must be after 2002.03.20. Also, the pattern file attribute value is set under the condition that the date indicating the version of the pattern file installed in the transmission source computer must be after 2002.03.01.

These conditions in the safety check table 60 can be registered on the basis of inputs from a panel 107 or key 108 of the printer 100 and/or on the basis of input information from an external apparatus.

If in step S503 a predetermined number (e.g., one or all) or more of the conditions set in the safety check table 60 are met, the flow advances to step S506 to execute job processing (e.g., printing) of the received data. After that, the flow advances to step S507.

On the other hand, if in step S503 a predetermined number of more of the conditions set in the safety check table 60 are not met, the flow advances to step S504 to cancel the high-speed processing mode (i.e., switch to the virus check preference mode) by changing the operation mode designating flag 307 in the received data. After that, the flow advances to step S505. In step S505, warning data (stored in, e.g., the hard disk 106) for notifying that the high-speed processing mode is canceled is loaded into the RAM 104, converted into print data from an engine controller 109 to a printer engine 110, and printed out. After that, the flow advances to step S507. As described above, if in step S503 it is determined on the basis of the contents of the safety check table 60 that the safety of the received data is not ensured, the job processing in step S506 is skipped, and the high-speed processing mode is canceled.

If the high-speed processing mode is not designated in step S502 (i.e., if the virus check preference mode is designated), the flow immediately advances to step S507.

In step S507, the virus check program 51 stored in the hard disk unit 106 is called. In response to this call, the virus check program 51 and the pattern file 53 for detecting a virus are loaded into the RAM 104, and the virus check program 51 is activated to perform virus check. In step S508, whether the print data is infected with a virus is determined on the basis of the result of the virus check. If it is determined that the print data is not infected with any virus, the virus check program 51 is terminated, and the flow advances to step S509.

In step S509, whether the printer 100 is operating in the high-speed processing mode is determined. This determination can be done by determining whether the job processing in step S506 is executed. As described above, step S506 is executed when the high-speed processing mode is designated for the received data (YES in step S502), and a predetermined number or more of the conditions set in the safety check table 60 are met (YES in step S503). In this case, the job processing is already completed in step S506, so this process is terminated. In other cases, the flow advances to step S510 to execute corresponding job processing.

If it is determined in step S508 that the print data is infected with a virus, the flow advances to step S511 to call the virus extermination program 52 stored in the hard disk unit 106. In response to this call, the virus extermination program 52 is loaded into the RAM 104 and activated. Consequently, the virus contained in the print data is invalidated.

In step S512, a new log number is generated in the virus infection log 54, and an infection log of this print data is additionally written. In addition, since the received data is found to be infected with a virus in step S508 although it is determined in step S503 that the data is safe because the conditions in the safety check table 60 are met, the conditions in the safety check table 60 are so rewritten that this received data is regarded as unsafe, thereby preventing the Job processing from being executed in step S506 even when similar data is received after that. Furthermore, if the high-speed processing mode has not been invalidated yet at this point, the mode is invalidated.

In step S513, warning data (stored in, e.g., the hard disk 106) indicating that the received data is infected with a virus and the virus is exterminated is loaded into the RAM 104, converted into print data from the engine controller 109 to the printer engine 110, and printed out. After that, this process is terminated.

In the second embodiment described above, even when the high-speed processing mode in which execution of job processing is given priority over virus check is designated (YES in step S502), if in step S503 it is determined on the basis of the result of comparison of the attribute information of received data with the safety check table 60 that the transmission source computer is not restricted by the table 60, or that virus check on the transmission source computer side is based on an old pattern file, it is determined that the safety of the received data is not assured (i.e., the received data may be infected with a virus), the job processing in step S506 is skipped, and as a consequence the high-speed processing mode is canceled.

As described above, the printer of this embodiment has a check unit for performing virus check on supplied data, and stores in a memory a table describing conditions for determining the safety of received data before virus check is performed. This printer further includes a controller for selecting the virus check preference mode in which virus check is executed before predetermined data processing such as printing, or the data processing preference mode (high-speed processing mode) in which virus check is performed after the predetermined data processing, and controlling the virus check execution timing in accordance with the selected mode. When selecting the high-speed processing mode, the controller changes this high-speed processing mode to the virus check preference mode on the basis of the conditions described in the table.

Conditions for a transmission source user name, transmission source computer name, network physical address, IP address, and transmission source domain name are set in the safety check table shown in FIG. 7, and a transmission source can be restricted by these conditions. In this embodiment, if the supply source of received data is not restricted by the above table, it is determined that the safety of this received data is not assured, and the high-speed processing mode is canceled. After that, virus check can be performed in step S507 as a pre-stage of the job processing in step S510. In short, information for specifying a group of safe transmission sources is described in the safety check table, and the high-speed processing mode is canceled if information for specifying the supply source of received data is not described in the table.

In addition, in the safety check table shown in FIG. 7, the condition that the data indicating the version of a pattern file installed in a transmission source computer must be after a predetermined day (in the example shown in FIG. 7, 2002.03.01) is set as the pattern file attribute value. It is convenient to set, as this predetermined day, the date indicating the version of the pattern file 53 installed in the printer 100. In this case, even when print data is transmitted after virus check is performed in a transmission source computer, if the version of a pattern file used in this virus check is older than that of the pattern file 53 in the printer 100, it is determined that the safety of the data is not ensured, and the high-speed processing mode is canceled. This makes it possible to reexecute virus check in step S507 in the printer, and execute the job processing in step S510 after that. In short, this embodiment can provide a mechanism by which the version of a pattern file in a transmission source computer is compared with that of a pattern file in the printer 100, and, if the version of the pattern file in the printer 100 is newer, the printer performs virus check again prior to job processing.

In addition to the processing explained above, it is also possible to change the program such that the high-speed processing mode is reset when a predetermined time has elapsed after the high-speed processing mode is cancelled in step S503.

Also, in the second embodiment, after the job processing is executed in the high-speed processing mode in step S506, the flow advances to step S507 to perform virus check. However, if jobs in the high-speed processing mode are continuously set, virus check may also be executed when jobs are not processed for a predetermined time or more, or at specific time (e.g., 2 a.m.)

In the second embodiment described above, a printer which receives data to be printed from an external apparatus and prints the data is explained. However, the present invention is also applicable to a computer peripheral apparatus such as a multifunction data processor (multifunction apparatus) having not only the above-mentioned printing function but also a facsimile transmitting/receiving function, a universal send function of simultaneously distributing digital data across a network to a plurality of addresses, a box function of storing data in an internal nonvolatile memory (e.g., a hard disk unit) of the apparatus, and the like.

FIG. 8 shows the structure of a safety check table applied to a multifunction apparatus. Note that a multifunction apparatus processes not only a print job explained in the above embodiments but also other types of jobs. Examples shown in FIG. 8 other than a normal print job supplied via a printer driver are a PDF direct print job for transmitting PDF (Portable Document Format) data directly to a printer without any intervention of a printer driver, a facsimile transmission job (SEND job) for performing facsimile transmission, and a storage job (BOX job) for storing data in a storage device of the multifunction apparatus. As shown in FIG. 8, conditions for determining the safety can be individually set in accordance with the type of job. In the examples shown in FIG. 8, conditions are set for the normal print job supplied via a printer driver, so the high-speed processing mode is canceled if these conditions are not met. However, since no conditions are set for the PDF direct print job, the high-speed processing mode is not canceled.

The printers of the first and second embodiments are so designed as to select an operation mode in accordance with designation information contained in supplied data. However, the present invention is not limited to these embodiments. For example, an operation mode can also be designated by the user of a printer.

Note that the present invention can be implemented even if there is no such clear concept as an "operation mode" as described above. In short, the substantial characteristic of the present invention is to control the execution timing of virus check for supplied data on the basis of "predetermined determination criterions" for activating the virus check.

Other Embodiments

Although the embodiments of the present invention are described in detail above, the present invention is applicable to a system comprising a plurality of apparatuses or to an apparatus comprising a single device.

The present invention can also be achieved by supplying the program (corresponding to the flow chart shown in FIG. 2 or 5) of software for implementing the functions of the above-mentioned embodiments to a system or apparatus directly or from a remote place, and allowing a computer of the system or apparatus to read out and execute the supplied program code. In this case, the form is not limited to a program as long as the functions of the program are achieved.

Accordingly, the program code itself installed in the computer to implement the functional processing of the present invention by the computer also implements the present invention. That is, the scope of claims of the present invention includes the computer program itself for implementing the functional processing of the present invention.

The form of the program is not particularly limited as long as the functions of the program are achieved. Examples are an object code, a program executed by an interpreter, and script data to be supplied to an OS.

Examples of a recording medium for supplying the program are a flexible disk, hard disk, optical disk, magnetooptical disk, MO, CD-ROM, CD-R, CD-RW, magnetic tape, nonvolatile memory card, ROM, and DVD (DVD-ROM and DVD-R).

The program can also be supplied by connecting to a homepage of the Internet by using a browser of a client computer, and downloading the computer program itself of the present invention or a compressed file including an automatic installation function from the homepage to a recording medium such as a hard disk. It is also possible to divide the program code forming the program of the present invention into a plurality of files, and download the individual files from different homepages. That is, the scope of claims of the present invention includes a WWW server which allows a plurality of users to download a program file for implementing the functional processing of the present invention by a computer.

Furthermore, the program of the present invention can also be encrypted and distributed to users by storing the program in a storage medium such as a CD-ROM. In this case, a user who has cleared predetermined conditions is allowed to download key information for decryption from a homepage across the Internet. The encrypted program is executed by using the key information, and the functional processing of the present invention is implemented by installing the program in the computer.

Also, besides the functions of the above embodiments that are implemented by executing the readout program code by the computer, the functions of the embodiments can be implemented when an OS or the like running on the computer performs part or the whole of actual processing on the basis of designations by the program.

Furthermore, the functions of the above embodiments can be implemented when the program read out from the storage medium is written in a memory of a function expansion board inserted into the computer or of a function expansion unit connected to the computer, and a CPU or the like of the function expansion board or function expansion unit performs part or the whole of actual processing on the basis of designations by the program.

The present invention is not limited to the above embodiments and various changes and modifications can be made within the spirit and scope of the present invention. Therefore, to apprise the public of the scope of the present invention, the following claims are made.

What is claimed is:

1. A printing apparatus comprising:
    a receiving unit configured to receive print data and attribute data attached to the print data from a sender device, wherein the attribute data includes scan log data related to scanning of malicious code data performed in the sender device, and a designation of an operation mode indicating whether scanning for malicious code in the print data should occur before or after printing of print data;
    a scanning unit configured to perform scanning for detecting malicious code data in the print data; and
    a printing unit configured to perform printing of the print data,
    wherein if the designated operation mode is a high-speed processing mode and the attribute data satisfies at least one of predetermined safety conditions, said printing unit performs the printing before said scanning unit performs the scanning for malicious code in the print data, otherwise, said printing unit performs the printing after said scanning unit performed the scanning for malicious code in the print data.

2. The apparatus according to claim 1, wherein the predetermined safety conditions include a condition that the execution date of the last scanning in the sender device is later than a predetermined date, and a condition that the date indicating the version of a pattern file installed in the sender device is later than a predetermined date.

3. The apparatus according to claim 1, wherein the malicious code data includes a computer virus.

4. A printing method comprising:
    a receiving step, of receiving print data and attribute data attached to the print data, from a sender device, wherein the attribute data includes scan log data related to scanning of malicious code data performed in the sender device, and a designation of an operation mode indicating whether scanning for malicious code in the print data should occur before or after printing of print data;
    a scanning step, of scanning for detecting malicious code data in the print data; and
    a printing step, of performing printing of the print data,
    wherein if the designated operation mode is a high-speed processing mode and the attribute data satisfies at least one of predetermined safety conditions, said printing step includes performing the printing before performance of the scanning for malicious code in the print data in said scanning step, and otherwise, said printing step includes performing the printing after performance of the scanning for malicious code in the print data in said scanning step.

5. A computer-readable medium storing, in executable form, a program for causing a computer to perform a printing method comprising:

a receiving step, of receiving print data and attribute data attached to the print data, from a sender device, wherein the attribute data includes scan log data related to scanning of malicious code data performed in the sender device, and a designation of an operation mode indicating whether scanning for malicious code in the print data should occur before or after printing of print data;

a scanning step, of scanning for detecting malicious code data in the print data; and a printing unit configured to perform printing of the print data, wherein if the designated operation mode is a high-speed processing mode and the attribute data satisfies at least one of predetermined safety conditions, said printing step includes performing the printing before performance of the scanning for malicious code in the print data in said scanning step, and otherwise, said printing step includes performing the printing after performance of the scanning for malicious code in the print data in said scanning step.

* * * * *